(12) United States Patent
Daugela et al.

(10) Patent No.: US 7,742,255 B2
(45) Date of Patent: Jun. 22, 2010

(54) HEAD-DISC INTERFACE (HDI) MODAL RESPONSE MONITORING

(75) Inventors: Antanas Daugela, Savage, MN (US); Subra Nagarajan, Prior Lake, MN (US); Jason W. Riddering, Prior Lake, MN (US); Neal F. Gunderson, Lake Elmo, MN (US); John S. Wright, Minneapolis, MN (US); Stefan A. Ionescu, Burnsville, MN (US); Rick P. Freeman, Northfield, MN (US); Erick J. Lindquist, Oakdale, MN (US); Andrew R. Motzko, Delano, MN (US); Zine Eddine Boutaghou, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 360 days.

(21) Appl. No.: 11/776,206

(22) Filed: Jul. 11, 2007

(65) Prior Publication Data

US 2009/0015962 A1 Jan. 15, 2009

(51) Int. Cl.
*G11B 5/596* (2006.01)
(52) U.S. Cl. .................................. 360/78.12
(58) Field of Classification Search ............ 360/78.12, 360/75, 77.02, 265.7; 369/53.18, 124.01; 318/560, 611, 34
See application file for complete search history.

(56) References Cited

U.S. PATENT DOCUMENTS

| 5,459,383 | A | * | 10/1995 | Sidman et al. | 318/611 |
| 5,612,602 | A | * | 3/1997 | Kubota et al. | 318/560 |
| 6,118,613 | A | * | 9/2000 | Kojima | 360/75 |
| 6,310,749 | B1 | * | 10/2001 | Beatty et al. | 360/265.7 |
| 6,396,783 | B1 | * | 5/2002 | Bell et al. | 369/53.18 |
| 6,493,172 | B1 | * | 12/2002 | Morris et al. | 360/77.02 |
| 6,693,762 | B2 | | 2/2004 | Liu et al. | |
| 6,935,925 | B1 | | 8/2005 | Agrawal et al. | |
| 6,943,969 | B2 | | 9/2005 | Yokohata | |
| 7,000,459 | B2 | | 2/2006 | Riddering et al. | |
| 7,009,800 | B2 | | 3/2006 | Yang | |
| 7,016,139 | B2 | | 3/2006 | Baumgart et al. | |
| 7,054,084 | B2 | | 5/2006 | Fong et al. | |
| 7,327,103 | B1 | * | 2/2008 | El-Sadi | 318/34 |
| 2005/0057834 | A1 | | 3/2005 | Hirano et al. | |
| 2006/0039267 | A1 | * | 2/2006 | Hanks | 369/124.01 |

* cited by examiner

*Primary Examiner*—Fred Tzeng
(74) *Attorney, Agent, or Firm*—Fellers, Snider, et al.

(57) ABSTRACT

Apparatus and method for head-disc interface (HDI) modal response monitoring. A sensing element disposed on a rigid actuator arm is mechanically impedance matched to a head-disc interface (HDI) supported by the actuator arm to resonate at a predetermined frequency corresponding to at least one disturbance associated with the HDI.

20 Claims, 4 Drawing Sheets

HEAD-DISC INTERFACE (HDI) MODAL RESPONSE MONITORING

BACKGROUND

Data storage devices are used in a variety of applications to store and retrieve user data. The data are often stored to internal storage media provisioned within a data storage device housing.

The storage media can take a variety of forms, such as one or more rotatable discs accessed by an array of data transducers supported by a moveable actuator. The transducers are configured to be hydrodynamically "flown" a selected distance from the media to form a head-disc interface (HDI). As will be appreciated, certain types of disturbances at the HDI, such as intermittent or continuous contact between the transducers and the media, can adversely affect storage device performance.

SUMMARY

Various embodiments are generally directed to an apparatus and method for head-disc interface (HDI) modal response monitoring.

In accordance with various embodiments, a sensing element disposed on a rigid actuator arm is mechanically impedance matched to a head-disc interface (HDI) supported by the actuator arm. The sensing element resonates at a predetermined frequency corresponding to at least one disturbance associated with the HDI.

DETAILED DESCRIPTION

Figure 1:
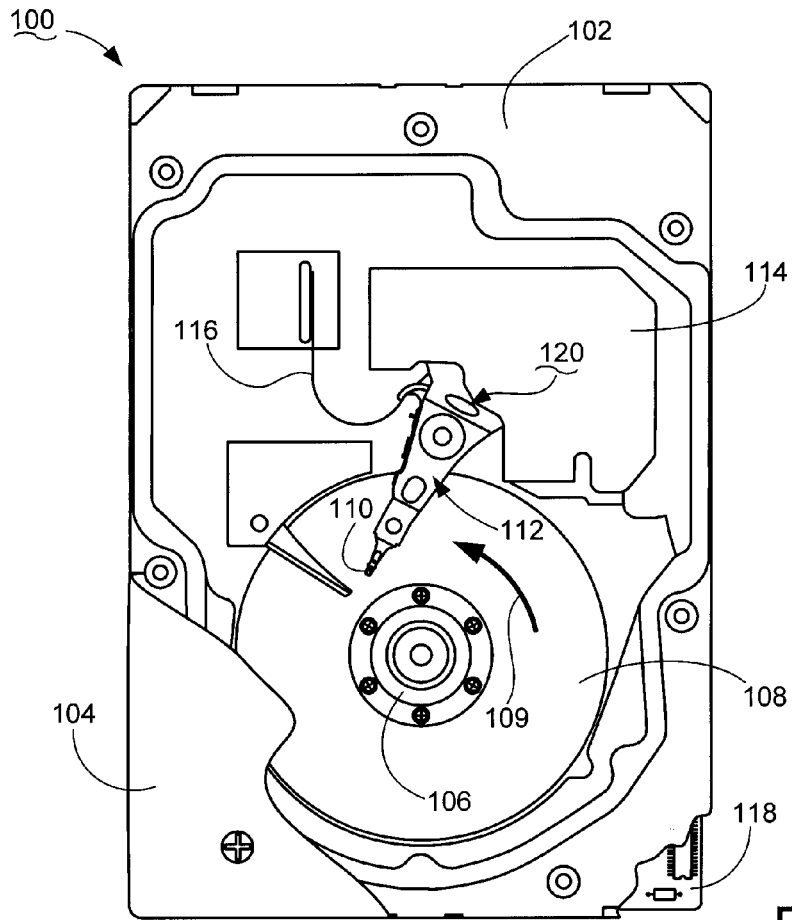
FIG. 1 shows an exemplary data storage device.

FIG. 1 shows an exemplary data storage device in accordance with various embodiments. The device is characterized as a hard disc drive of the type configured to store and transfer user data with a host device, although such is not limiting.

The device 100 includes a housing formed from a base deck 102 and top cover 104. An internally disposed spindle motor 106 is configured to rotate a number of storage media 108 in rotational direction 109. The media 108 are accessed by a corresponding array of data transducers (heads) 110 disposed adjacent the media to form a head-disc interface (HDI). While FIG. 1 shows the use of two (2) magnetic recording discs and four (4) corresponding heads, other numbers of heads and discs, as well as other types of media, can be readily utilized as desired.

A head-stack assembly ("HSA" or "actuator") is shown at 112. The actuator 112 rotates through application of current to a voice coil motor (VCM) 114. Controlled operation of the VCM 114 causes the transducers 110 to align with tracks (not shown) defined on the media surfaces to store data thereto or retrieve data therefrom. A flex circuit assembly 116 provides electrical communication paths between the actuator 112 and device control electronics on an externally disposed printed circuit board (PCB) 118.

The actuator 112 is further shown in FIG. 1 to support a modal strain sensor 120. As explained below, the sensor 120 (also referred to as a "sensing element") generally operates to detect various disturbances associated with the HDI during operation.

Figure 2:
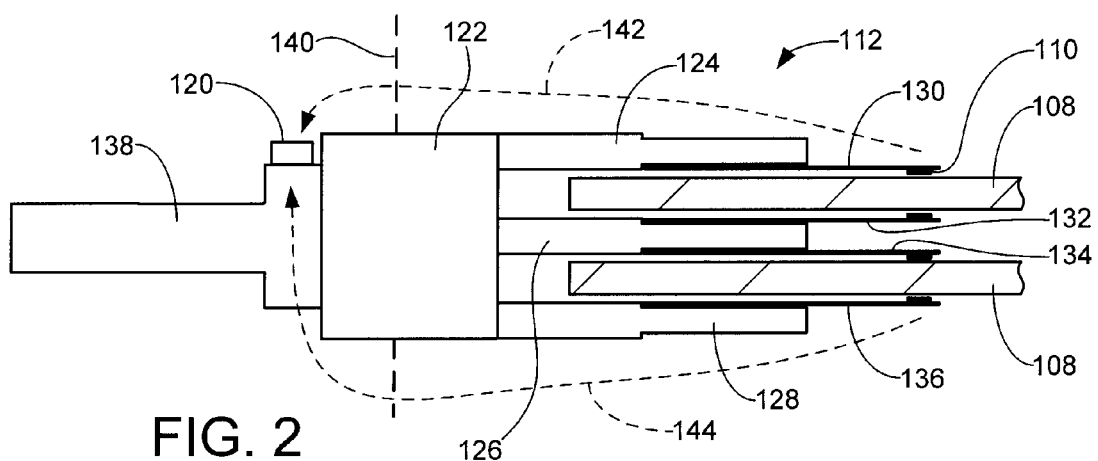
FIG. 2 provides an elevational representation of an actuator of the device of FIG. 1.

FIG. 2 provides an elevational representation of the actuator 112 of FIG. 1. The exemplary actuator 112 has a main body (e-block) portion 122 from which three (3) rigid head support arms 124, 126 and 128 extend. Head gimbal assemblies (HGAs), or flexures, respectively extend from the distal ends of the arms 124, 126, 128 to support the transducers 112 proximate the associated media surfaces. A total of four (4) HGAs are shown and are respectively denoted at 130, 132, 134 and 136. The intermediate arm 126 supports two HGAs 132, 134, whereas the top and bottom arms 124, 128 each support a single HGA (130 or 136, respectively).

A rigid coil support arm 138 extends from the main body portion 122 opposite the actuator arms 124, 126, 128. The arm 138 supports a voice coil (not separately shown) within a magnetic field of the VCM 114. Application of current to the voice coil induces pivotal movement of the main body portion 122 about an actuator axis 140. The rigid portions of the actuator 112 that respectively extend from the actuator axis 140 are collectively referred to herein as a unified "actuator arm" or a "control arm."

The sensor 120 is shown in FIG. 2 to be rigidly coupled to the coil support arm 138, although the sensor 120 can be rigidly coupled to other locations of the actuator 112 including the main body portion 122 or on one of the respective head support arms 124, 126, 128. The sensor 120 is configured to have a mechanical impedance that nominally matches a mechanical impedance of the HDI. This enables the sensor to detect certain vibration modes that correspond to relevant events relating to the head-disc interface (HDI), while rejecting or ignoring other vibrational frequencies.

The modal strain sensor 120 can take a variety of forms, and is preferably designed to couple with air bearing (AB) and/or slider modes. The sensor and control arm are physically dimensioned such that sharp resonance peaks will nominally align with AB and slider frequencies.

Mechanical impedance Z is a physical quantity related to an applied driving force F and monitored velocity v derived therefrom, such as:

$$Z = \frac{F}{v} \tag{1}$$

Mechanical impedance can be derived at any point of a dynamic system and can be represented as individual elements connected in parallel or in series. An equivalent mechanical impedance of a measuring system $Z_{eq}$ comprises the mechanical impedance related to the head-disc interface (HDI), $Z_{HDI}$, and mechanical impedance of the modal sensor $Z_{modal}$ connected in series as follows:

$$Z_{eq} = \frac{Z_{modal} Z_{HDI}}{Z_{modal} + Z_{HDI}} \quad (2)$$

In accordance with some embodiments, the strain sensor 120 is configured such that the associated mechanical impedances of the head gimbal assembly (HGA), suspension, and E-block 122 are substantially negligible, allowing the dynamic response of the sensor 120 to be triggered by exciting modes of the air bearing and/or slider only. Mechanical impedance of the modal induced strain is optimized in such a way that:

$$Z_{modal}(f_{AB}, f_{slider}) \approx Z_{HDI}(f_{AB}, f_{slider}) \quad (3)$$

where $f_{AB}$, $f_{slider}$, are modes of the air bearing and slider, respectively.

$Z_{modal}$ is a known (or estimated) value established by the design of the actuator 112. The $Z_{HDI}$ value is unknown and will generally correspond to the HDI changes in time and frequency domains. $Z_{eq}$ will be expressed as an electrical signal output by the sensor 120 in response to the input force received through the control arm. The unknown value $Z_{HDI}$ can thus be derived by subtracting the $Z_{modal}$ value from the measured $Z_{eq}$ signal.

Preferably, multiple HDI interactions are concurrently monitored by a single sensor 120. The individual HDI interactions can be individually identified and tracked based on the different time delays associated with different length acoustic wave paths between the associated HDI and the sensor 120. Two such exemplary paths are generally represented in FIG. 2 at 142, 144 respectively. While these paths are shown to pass outside the actuator 112 in FIG. 2, this is merely for simplicity of illustration; it will be understood that the paths 142, 144 extend wholly through and along the actuator material.

The first path 142 generally describes the path that vibrations/acoustic energy will take through the actuator structure between the topmost transducer 112 and the sensor 120. This first path 142 primarily passes through HGA 130, arm 124, main body portion 122 and arm 138. The second path 144 correspondingly describes the path between the bottommost transducer 112 and the sensor 120, and passes through HGA 136, arm 128, main body portion 122 and arm 138. Because of the relative location of the sensor 120 with respect to the top and bottom arms 124, 128, it will be appreciated that the second path 144 is substantially longer than the first path 142.

Generally, a time delay $\Delta t$ between two modal signals can be expressed as follows:

$$\Delta t = \frac{2L}{c} \quad (4)$$

where L is a length of the acoustic wave path and c is the velocity of sound. For example, a stainless steel sheet/shell structure (flexure) can have a value of about $c \approx 5000$ m/s. An acoustic path L from the HDI to the modal induced strain sensor mounted on the actuator arm (E-block) of the drive is a sum of arm and suspension length $L_{arm\_Li}$ and arm height $L_{arm\_Hi}$ for every arm i. Thus, an acoustic wave path for a drive with N arms can be formalized as follows:

$$L = \sum_{i=1}^{N} (L_{arm\_Li} + L_{arm\_Hi-1}), i \in 1, 2 \ldots \quad (5)$$

For reference, exemplary time delay differentials between two different arms can be on the order of about 30 microseconds, $\mu s$ ($30 \times 10^{-6}$ sec), and exemplary time delay differentials between two sliders on the same arm (e.g., HGAs 132, 134 on arm 126 in FIG. 2) can be on the order of around 4 $\mu s$. Knowledge of acoustic path related delays, modal signal shape and features such as rise time, noise floor level, etc. facilitates HDI disturbance indexing and characterization.

HDI dynamics can be tracked by monitoring air bearing and slider modes. Subtle changes in those modes can be correlated to HDI phenomena such as particle interaction, lubricant depletion, and skip writes. This information may be useful to inform intelligent drive control to prevent data loss.

Because the actuator structure is used to propagate the HDI disturbances to the sensor 120, the monitored response will be substantially independent of disc radius; that is, the response will be nominally consistent across the full stroke of the actuator 112 from the innermost diameter (ID) to the outermost diameter (OD) of the media stack.

Figure 3:
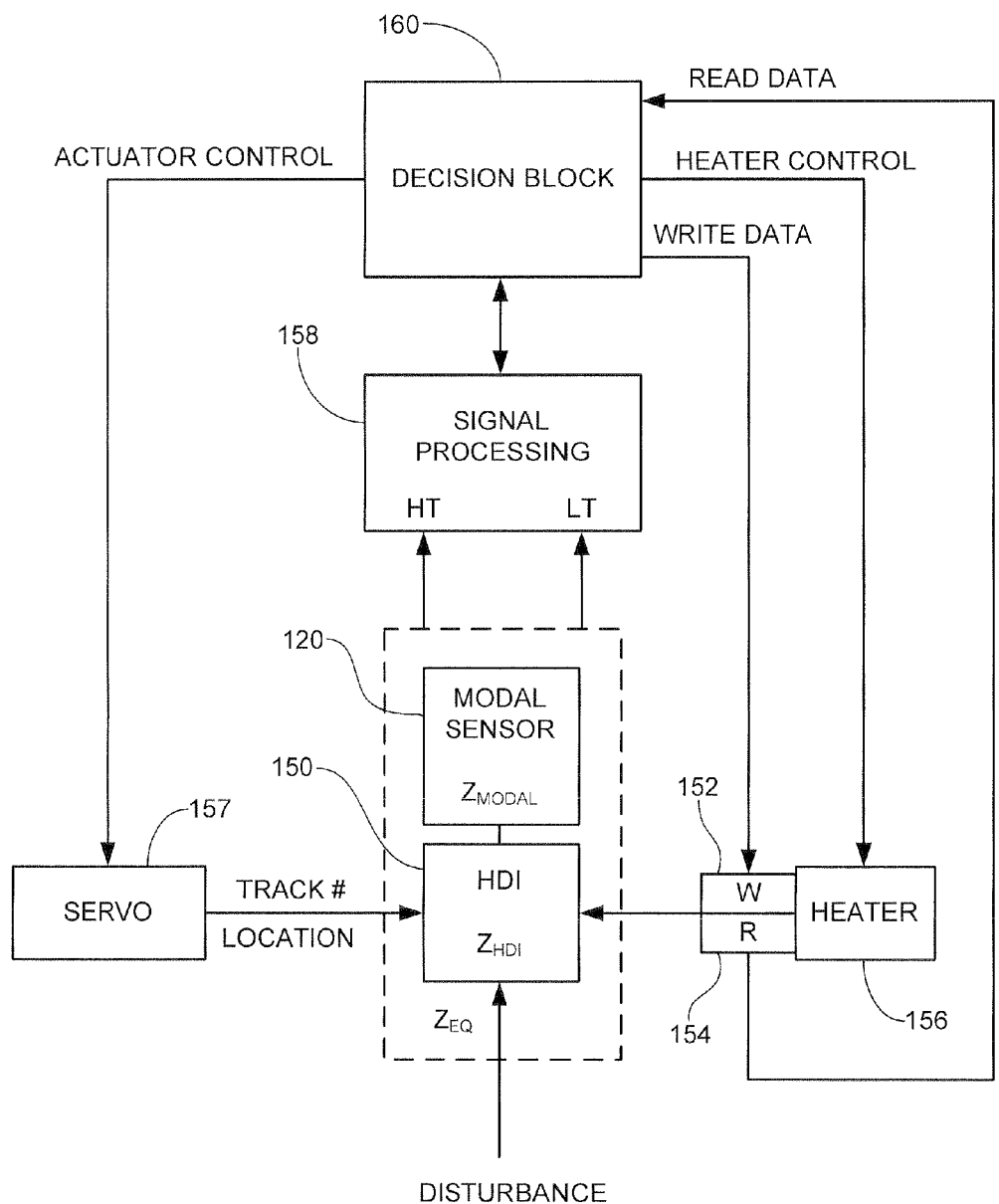
FIG. 3 is a functional block representation of portions of the device of FIG. 1 constructed in accordance with various embodiments.

FIG. 3 provides a functional block representation of selected portions of the device 100 of FIG. 1. Constituent components of the actuator 112 of FIGS. 1-2 are separately represented in FIG. 3 to include the sensor 120, the mechanical portions of a selected transducer/media surface that make up the head-disc interface (HDI block 150), and electrically operative elements of the selected transducer 112 including a write element 152, a read element 154 and a heater 156. A servo control block 157 generally represents components associated with the closed-loop positional control of the transducer 112, including the aforementioned VCM coil (FIG. 2).

The write element 152 magnetically writes data to the associated media surface and is preferably characterized as a perpendicular recording coil and core structure. The read element 154 reads previously written data from the media surface and is preferably characterized as a magneto-resistive (MR) element.

The heater 156 constitutes a fly height control (FHC) mechanism to selectively adjust the fly height of the slider structure portion of the HDI 150 through thermal expansion. Alternative types of FHC configurations can be used, however, such as piezoelectric transducers, magneto-striction elements, etc.

The modal induced strain sensor 120 is mechanically impedance matched to the HDI 150 to resonate at a predetermined frequency corresponding to at least one monitored disturbance event associated with the HDI. The sensor 120 generally operates to convert the mechanical impedance driven modal response of the HDI block 150 to a corresponding time and frequency varying electrical signal.

The sensor 120 can take any number of suitable forms such as an electrostrictive material, a piezoelectric material (e.g., piezo ceramic, quartz, single crystal, etc.), a magnetostrictive material, or combinations thereof. Generally, the physical 3D shape and orientation of the sensor 120 are selected to define the modal response which is optimized and aligned with $f_{AB}$ and $f_{slider}$ modes for the most efficient mechanical impedance monitoring. Various structural modes (e.g., longitudinal, bending, and/or torsional) can be utilized.

Continuing with FIG. 3, the electrical signals output by the sensor 120 are supplied to a signal processing block 158. The signal processing block 158 can be realized in firmware or hardware, and performs electric signal (wave) capturing, amplification, bandpass filtering and logical signal differentiation tasks.

The signal processing block 158 further differentiates among signals from the sensor 120 for multilevel thresholding of the signals. In a preferred embodiment, a Low level Threshold (LT) is used to capture weak HDI interactions, such as asperity or particulate impact events, excessive lubricant layers, and heater induced contact reads/writes.

A High level Threshold (HT) is used to capture servo and start/stop induced mechanical impedance changes. The threshold functionality of the processing block 158 includes amplitude and rise time capturing capabilities to identify and distinguish among these various modes, as explained below.

FIG. 3 further shows a decision block 160. The decision block 160 provides top level control of the VCM 114 and the electrical portions of the transducer 152, 154, 156 in response to the signal processing block 158. More specifically, the decision block 160 monitors the system and determines an appropriate course of action in response to an interpreted HDI disturbance (e.g., rewrite previously written data, reposition the actuator 112 to a new location for an I/O operation, ignore the disturbance event, etc.). As with the signal processing block 158, the decision block 160 can be realized in firmware or hardware, as desired.

Figure 4:
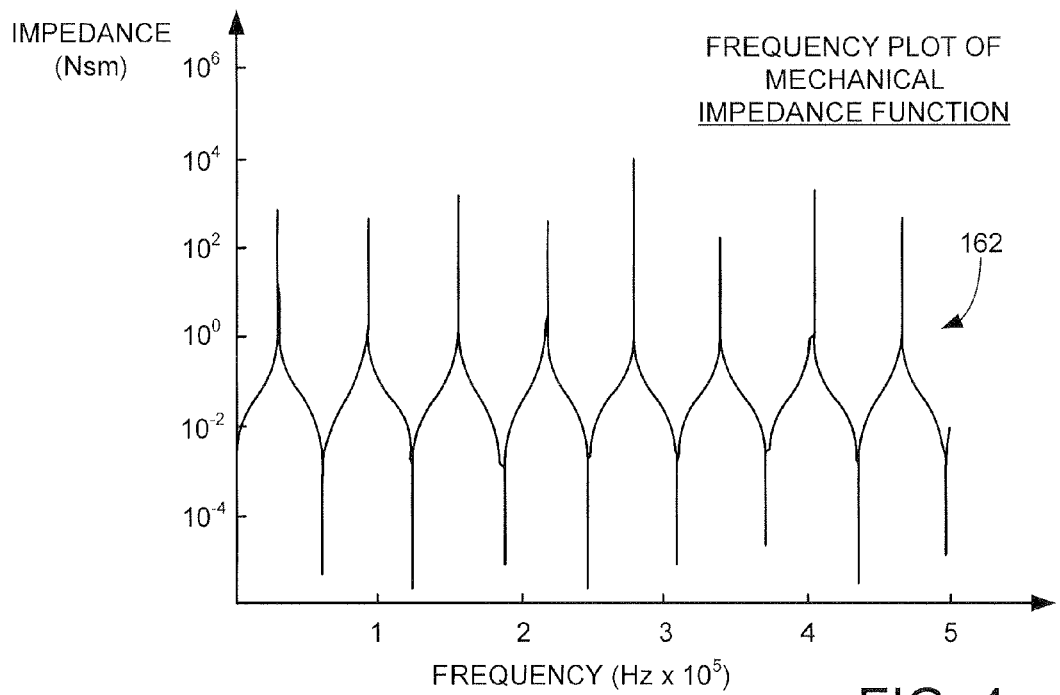
FIG. 4 sets forth an exemplary mechanical impedance function of a modal induced strain sensor affixed to the actuator.

An exemplary mechanical impedance response function for the sensor 120 is depicted at 162 in FIG. 4. The response function generally represents the sensor response in terms of mechanical impedance v. frequency for a selected mode, such as shear, bending or compression. As can be seen from FIG. 4, relatively sharp resonance responses are depicted at frequencies of substantially 70,000 Hz (70 kHz), 120 kHz, 185 kHz, 245 kHz, etc. These exemplary response frequencies were determined after empirical analysis indicated that the corresponding AB modes were in the vicinities of these frequencies. It will be noted that the resonances of interest are the downwardly extending (lowest) peaks in FIG. 4, as these correspond to the lowest values of mechanical impedance (resistance).

As noted above, the diagram of FIG. 3 is configured to provide modal response monitoring, analysis and remedial action over a variety of different types of operational modes. A first such mode generally relates to modal response monitoring in the presence of relatively weak HDI interaction caused by heater induced contact with the associated medium 110 (disc).

With reference again to FIG. 3, this can arise when a heater command signal (e.g., specified voltage) is applied to the heater 156 to adjust the fly height of the slider to a desired fly height. Due to a number of factors such as disc waviness, however, it is possible that a lowered commanded fly height can result in undesired, continuous physical contact of the slider with the media surface, rather than flight of the slider a selected distance thereabove. For reference, an exemplary specified fly height during a read or write operation can be relatively small, such as on the order of 3 nanometers, nm ($3 \times 10^{-9}$ meters).

Figure 5:
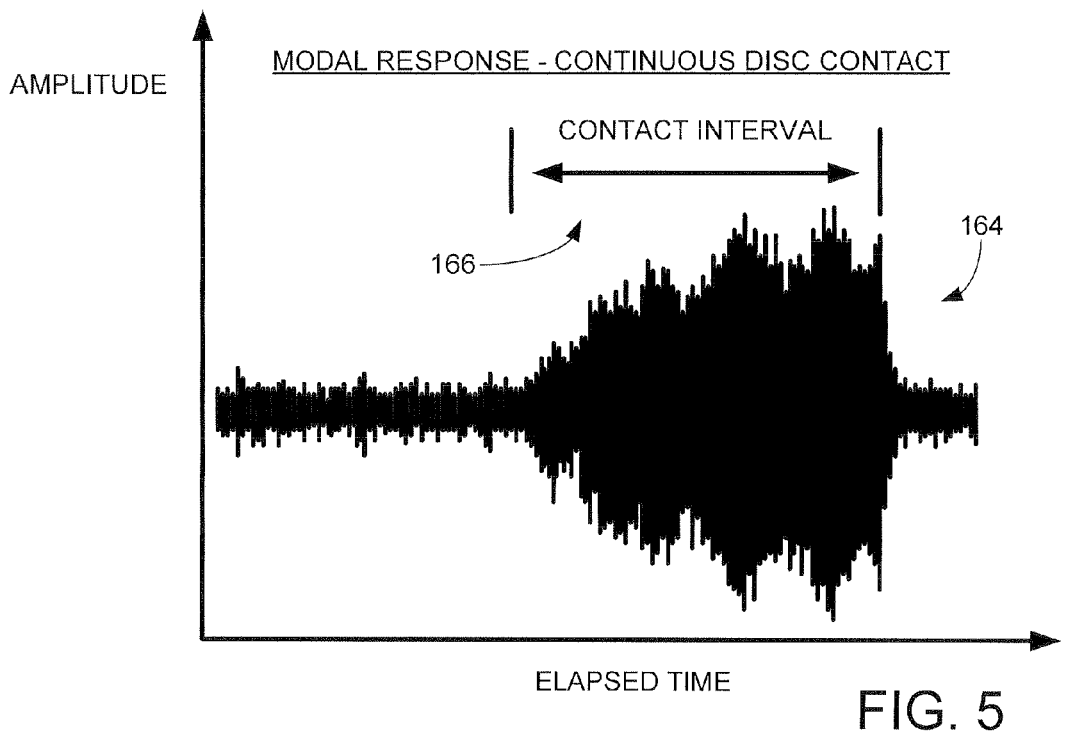
FIG. 5 is a graphical representation of an exemplary modal response detected by the sensor.

FIG. 5 depicts a modal response curve 164 generally representative of the output of the sensor 120 under such circumstances. As can be seen from FIG. 5, the amplitude of the sensor output increases significantly over a contact interval 166 at which the associated slider is dragged along the associated media surface.

In response, the decision block 160 (FIG. 3) can take appropriate action, such as to direct the servo control block 157 (FIG. 3) to maintain the present position of the actuator 112 over the desired track, while adjusting the heater control input to alleviate the head-disc contact condition. In this way, active and adaptive control of flying height can be facilitated via feedback obtained from the sensor 120 apart from the R/W elements 152, 154. Depending on the configuration of the device 100, the decision block 160 may further command a write verify operation to verify the recording accuracy of data written during the disc-contact interval.

Figure 6:
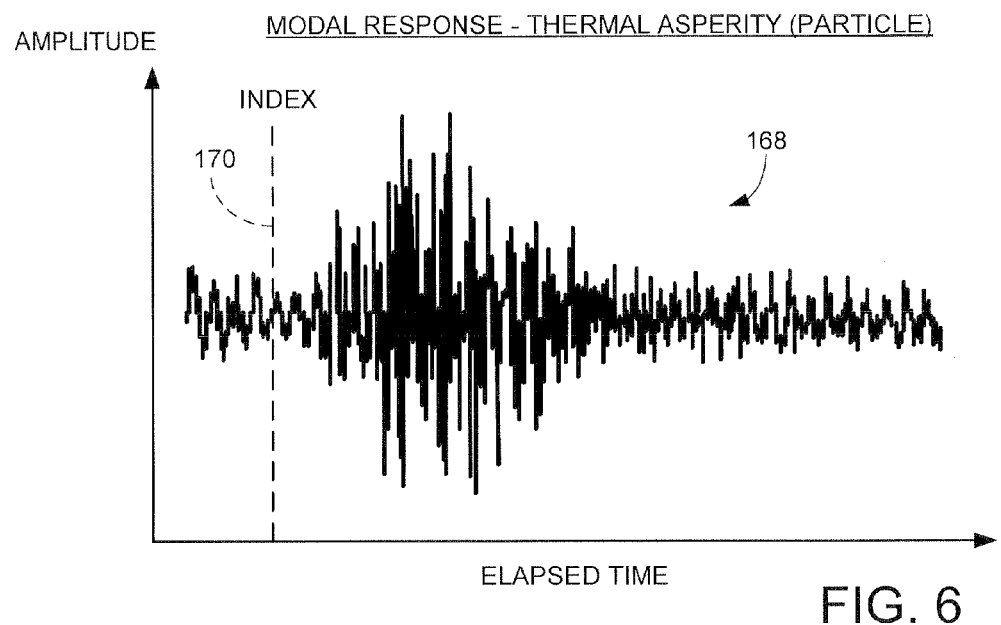
FIG. 6 is a graphical representation of another modal response detected by the sensor.

Another mode of operation for the diagram of FIG. 3 generally relates to the detection of stochastic disturbances such as particles, skip writes, and asperities encountered during data I/O operations. This is generally set forth by FIG. 6, which provides a response curve 168 representative of the output of the sensor 130 in the presence of contact between the slider and a particle embedded on the media surface or entrapped by the HDI. Time since an index point 170 can be monitored to evaluate the time delays associated with the propagation of the disturbance through the actuator structure. The waveform pattern generally indicates physical deflection/resonance of the HDI from the kinetic energy associated with the particulate impact event.

As before, the decision block 160 may determine what corrective actions are required, including read recovery during a read operation, the rewriting of data if the disturbance occurred during a write operation, and so on. It is noted that if the disturbance occurs between with the active transducer 112 during a read operation, the disturbance may be additionally exhibited in the transduced readback signal as a thermal asperity event due to localized heating or cooling of the associated read element 154.

It will be noted, however, that the diagram of FIG. 3 detects disturbances that involve any or all of the transducers, including transducers that are not currently active (e.g., carrying out a read operation). This is because the resulting resonances will propagate through the actuator structure to the sensor 120, irrespective of whether the particular transducer that contacted a particle is active or not. The specific transducer that was involved in the disturbance can be individually identified based on the time delays associated with the actuator structure. The decision block 120 can thus further determine whether data should be rewritten by a first active transducer based on the magnitude of the disturbance encountered by a second, non-active transducer.

Other types of deterministic disturbances such as temperature, humidity, and altitude related weak HDI interactions may also be detected in similar fashion, and compensated accordingly. Each of the foregoing types of HDI interactions (disc contact disturbances, stochastic disturbances, deterministic disturbances) are preferably classified as LT (low threshold) disturbances and decisions are based on the associated LT thresholding and waveform characterizations.

Figure 7:
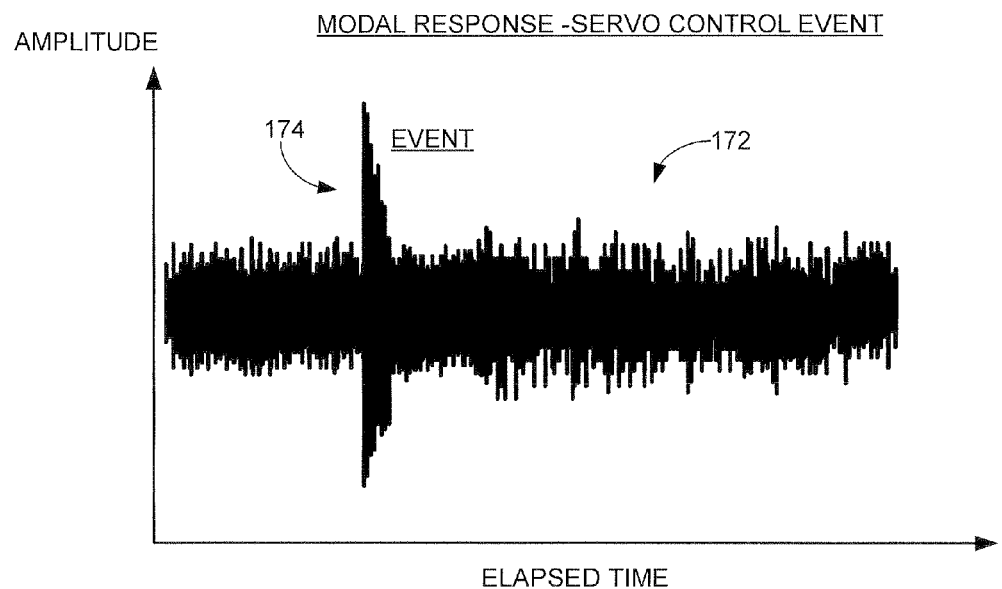
FIG. 7 is a graphical representation of still another modal response detected by the sensor.

Another mode of operation of the circuitry of FIG. 3 relates to the detection of strong HDI interactions, such as during servo control efforts and media spin-up and spin-down processes. FIG. 7 provides a sensor response curve 172 to generally represent the output of the sensor 120 in detecting a servo control event, such as a command to carry out a seek to move a selected transducer 110 from an initial track to a destination track. A localized portion 174 of the curve has an increased amplitude resulting from such actuator motion. Since the decision block 160 will have prior knowledge of the servo action (having initiated the same), the decision block 160 may merely collect the data for future reference, such as feedback correlation for seek tuning, etc.

The various operational modes described herein are merely exemplary in nature and will be understood to be neither exhaustive nor exclusive. The modal induced strain sensor 120 may be utilized to detect drive phenomena other than the examples given here. Preferably, the sensor 120 will detect a plurality of both LT and HT (high threshold) disturbances, each of which may or may not be acted upon by the decision block 160 and other hardware and/or software of the device 100.

It will be appreciated that the various embodiments disclosed herein provide advantages over the prior art. It is contemplated that the ability to correlate read/write errors with HDI disturbances can lead to significant improvements in device performance. The effects of various uncertainties such as particles, skip writes, disc contact conditions, etc. can be identified and addressed appropriately. Acoustic defect fingerprinting can be implemented on an individual device basis, further permitting the development of overall defect databases that cover manufacturing and/or field service operations.

The feedback supplied by the sensor 120 is further nominally consistent across the entire media radius, unlike other systems that rely on transduced data from the media and servo circuitry operation such as with position error signal (PES) based systems. The disclosed sensor 120 can thus provide enhanced sensor resolution sensitivity that may be orders of magnitude higher than existing processes, greatly expanding HDI disturbance characterization and resolution.

While exemplary embodiments have been set forth in the environment of a hard disc drive data storage device, it will be appreciated that the foregoing embodiments can be adapted for use in any number of suitable environments It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a sensing element disposed on a rigid actuator arm, the sensing element having a mechanical impedance which matches a mechanical impedance of a head-disc interface (HDI) supported by the actuator arm to resonate at a predetermined frequency corresponding to at least one disturbance associated with the HDI.

2. The apparatus of claim 1, wherein the sensing element comprises an electrostrictive material.

3. The apparatus of claim 1, wherein the sensing element comprises a magnetostrictive material.

4. The apparatus of claim 1, wherein the sensing element comprises a piezoelectric material.

5. The apparatus of claim 1, wherein the at least one disturbance comprises continuous contact between a transducer and a medium surface.

6. The apparatus of claim 1, wherein the HDI comprises a transducer supported by the actuator arm adjacent a media surface.

7. The apparatus of claim 6, wherein the actuator arm pivots about a pivot axis, and wherein the sensor is contactingly disposed on a first side of the pivot axis opposite the transducer.

8. The apparatus of claim 6, wherein the transducer is characterized as a first transducer, and wherein the HDI further comprises a second transducer adjacent a second media surface.

9. The apparatus of claim 1, further comprising a signal processing block which processes an output signal from the sensor to classify the at least one disturbance.

10. The apparatus of claim 9, further comprising a decision block which adjusts a position of the actuator arm in response to said classification by the signal processing block.

11. A storage device comprising:
a rigid actuator arm which supports a transducer adjacent a storage surface to form a head-disc interface (HDI); and
a sensing element rigidly coupled to the actuator arm, the sensing element having a mechanical impedance selected to match a mechanical impedance of the HDI to detect a disturbance associated with the HDI propagated through the actuator arm.

12. The storage device of claim 11, further comprising a signal processing block which processes an output signal from the sensing element to classify the disturbance.

13. The storage device of claim 12, further comprising a decision block which adjusts a position of the actuator arm in response to said classification by the signal processing block.

14. The storage device of claim 12, wherein the transducer is characterized as a first transducer and the storage surface is characterized as a first storage surface, wherein the actuator arm supports a second transducer adjacent a second storage surface, and wherein the signal processing block identifies the disturbance to be associated with a selected one of the first or second transducers in relation to respective acoustic path lengths between said transducers and the sensing element.

15. The storage device of claim 11, wherein a fly height of the transducer is adjusted in relation to the detected disturbance.

16. A method comprising:
coupling a sensing element to a rigid actuator arm of a storage device, the sensing element having a mechanical impedance selected to match a mechanical impedance of a head-disc interface (HDI) supported by the actuator arm so as to resonate at a predetermined frequency corresponding to at least one disturbance associated with the HDI; and
detecting a selected one of the said at least one disturbance in relation to an output of the sensing element.

17. The method of claim 16, wherein the disturbance comprises continuous contact between a transducer supported by the actuator arm and an associated media surface, and wherein the method further comprises a step of commanding an increased fly height of the transducer to discontinue said continuous contact.

18. The method of claim 16, wherein the disturbance comprises a weak HDI interaction.

19. The method of claim 16, wherein the detecting step comprises identifying a selected transducer associated with the disturbance out of a plurality of transducers supported by the actuator arm in relation to a time delay associated with an output signal generated by the sensing element.

20. The method of claim 16, further comprising a step of adjusting a radial position of the actuator arm in response to the detected disturbance.

* * * * *

UNITED STATES PATENT AND TRADEMARK OFFICE
CERTIFICATE OF CORRECTION

PATENT NO.       : 7,742,255 B2                                        Page 1 of 1
APPLICATION NO.  : 11/776206
DATED            : June 22, 2010
INVENTOR(S)      : Antanas Daugela et al.

It is certified that error appears in the above-identified patent and that said Letters Patent is hereby corrected as shown below:

On title page, item 75 Inventors,
replace "Erick J. Lindquist"
with "Erik J. Lindquist."

In Col. 4, line 9
replace "see) and"
with "sec) and."

Signed and Sealed this

Seventeenth Day of August, 2010

David J. Kappos
*Director of the United States Patent and Trademark Office*